(12) United States Patent
Mizuno et al.

(10) Patent No.: US 11,501,898 B2
(45) Date of Patent: Nov. 15, 2022

(54) WIRE HARNESS AND METHOD OF MANUFACTURING WIRE HARNESS

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Mie (JP); Hiroki Hirai, Mie (JP); Makoto Higashikozono, Mie (JP); Daichi Fukushima, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/043,105

(22) PCT Filed: Aug. 22, 2018

(86) PCT No.: PCT/JP2018/030915
§ 371 (c)(1),
(2) Date: Sep. 29, 2020

(87) PCT Pub. No.: WO2019/187196
PCT Pub. Date: Oct. 3, 2019

(65) Prior Publication Data
US 2021/0027916 A1 Jan. 28, 2021

(30) Foreign Application Priority Data
Mar. 30, 2018 (JP) .............................. JP2018-067192

(51) Int. Cl.
*H01B 7/40* (2006.01)
*H01B 3/44* (2006.01)
(Continued)

(52) U.S. Cl.
CPC ............... *H01B 7/40* (2013.01); *H01B 3/448* (2013.01); *H01B 13/01209* (2013.01); *B60R 16/0207* (2013.01)

(58) Field of Classification Search
CPC ............... H01B 7/0045; H01B 13/012; H01B 13/01209; H01B 13/06; H01B 7/04;
(Continued)

(56) References Cited

U.S. PATENT DOCUMENTS 3,857,995 A * 12/1974 Wyrick .................. H01R 4/188
174/84 C
3,862,870 A * 1/1975 Suda ..................... B32B 27/304
428/920
(Continued)

FOREIGN PATENT DOCUMENTS

JP S50-54597 5/1975
JP S61-288312 12/1986
(Continued)

OTHER PUBLICATIONS

International Search Report issued in International Patent Application No. PCT/JP2018/030915, dated Oct. 2, 2018, along with an English translation thereof.
(Continued)

*Primary Examiner* — Krystal Robinson
(74) *Attorney, Agent, or Firm* — Greenblum & Bernstein, P.L.C.

(57) ABSTRACT

A wire harness includes: an electrical wire including a core wire and an insulating covering for covering the core wire; and a sheet material in which the electrical wire is disposed
(Continued)

on a resin main surface, and a part of the main surface having contact with the electrical wire is welded to the insulating covering of the electrical wire, thereby forming an electrical wire fixing part. A thickness dimension of a first covering part in the insulating covering on a side of the electrical wire fixing part in relation to the core wire is formed smaller than a thickness dimension of a second covering part located on an opposite side of the core wire.

7 Claims, 4 Drawing Sheets

(51) Int. Cl.
*H01B 13/012* (2006.01)
*B60R 16/02* (2006.01)

(58) Field of Classification Search
CPC .... H01B 7/0823; H01B 7/28; H01B 13/0016; H01B 13/16; H01B 3/448; H01B 7/00; H01B 7/0838; H01B 7/0892; H01B 7/2825; H01B 7/285; H01B 7/40; H01R 13/405; H01R 43/24; H01R 4/18; H01R 4/70; H01R 4/2462; H01R 4/4818; H01R 4/58

See application file for complete search history.

(56) References Cited

U.S. PATENT DOCUMENTS

| | | | | |
|---|---|---|---|---|
| 6,578,263 | B2* | 6/2003 | Ichikawa | H01R 43/00 29/743 |
| 2002/0017550 | A1* | 2/2002 | Murakami | H01R 43/0207 228/180.5 |
| 2002/0096358 | A1 | 7/2002 | Murakami et al. | |
| 2002/0170729 | A1 | 11/2002 | Murakami et al. | |
| 2013/0056266 | A1* | 3/2013 | Inoue | H01B 7/2806 524/556 |
| 2013/0062094 | A1* | 3/2013 | Naert | C08K 5/10 174/110 SR |
| 2014/0154927 | A1* | 6/2014 | Nonen | H01R 13/65917 29/857 |
| 2015/0283962 | A1* | 10/2015 | Kobayashi | B60R 16/0207 174/72 A |
| 2015/0340848 | A1* | 11/2015 | Nakashima | H01B 13/003 427/508 |
| 2016/0006233 | A1* | 1/2016 | Oshiumi | H01B 7/2806 174/76 |

FOREIGN PATENT DOCUMENTS

| | | |
|---|---|---|
| JP | 2001-505706 | 4/2001 |
| JP | 2002-50236 | 2/2002 |
| JP | 2002-80819 | 3/2002 |
| JP | 2002-216871 | 8/2002 |
| JP | 2002-343156 | 11/2002 |
| JP | 2003-257513 | 9/2003 |
| JP | 2015-72798 | 4/2015 |
| JP | 2015-90783 | 5/2015 |
| WO | WO98/18138 | 4/1998 |

OTHER PUBLICATIONS

Written Opinion issued in International Patent Application No. PCT/JP2018/030915, dated Oct. 2, 2018, along with an English translation thereof.
International Preliminary Report on Patentability issued in International Patent Application No. PCT/JP2018/030915, dated Oct. 6, 2020, along with an English translation thereof.
Japanese Office Action in counterpart JP application No. 2020-025884, dated Dec. 1, 2020 (along with machine translation thereof).
Chinese Office Action in counterpart Chinese Application No. 201880091664.X, dated Jul. 28, 2021 (along with English translation thereof).
"Commodity Credit Theory," China Commercial Publishing House, pp. 129-130, May 31, 1998.

* cited by examiner

F I G. 5
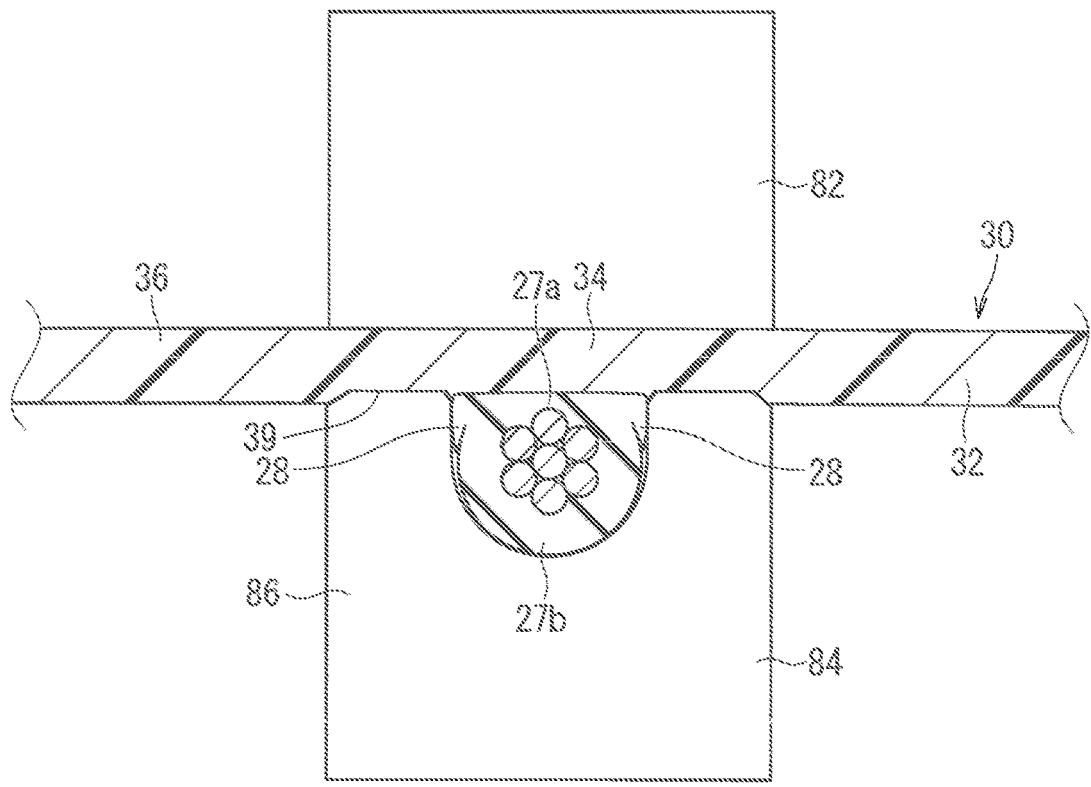
F I G. 6
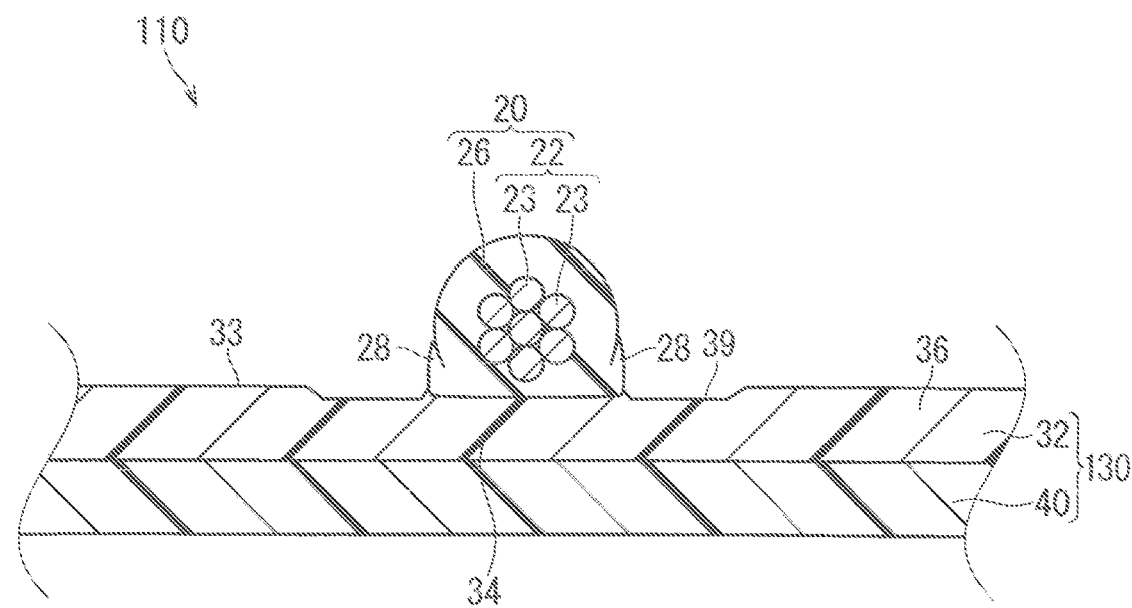

WIRE HARNESS AND METHOD OF MANUFACTURING WIRE HARNESS

TECHNICAL FIELD

The present invention relates to a technique of attaching electrical wires to an exterior member in a wire harness for vehicle.

BACKGROUND ART

Patent Document 1 discloses a technique, when a sheet-like exterior member is attached to electrical wires, for positioning the exterior member with respect to the electrical wires by winding a tape around each end portion of the exterior member and the electrical wires extending from the end portion.

PRIOR ART DOCUMENTS

Patent Documents

Patent Document 1: Japanese Patent Application Laid-Open No. 2015-72798

SUMMARY

Problem to be Solved by the Invention

Herein, the applicant of the present application proposes, as a new method of fixing the electrical wires and the sheet-like exterior member, a method of directly fixing an insulating covering of the electrical wires and a sheet material by welding. In a case of a wire harness in which the insulating covering of the electrical wires and the sheet material are directly welded and fixed, a thickness of the wire harness is considered a sum of a diameter of the electrical wires and a thickness of the sheet material before welding, for example.

At this time, the wire harness is disposed in a limited space in a vehicle, so that if the thickness of the wire harness increases, a freedom degree of locating the wire harness may decrease.

Thus, an object of the present invention is to provide a technique capable of reducing a thickness of a wire harness in which an insulating covering of an electrical wire and a sheet material are directly welded and fixed.

Means to Solve the Problem

In order to solve the above problems, a wire harness according to a first aspect includes: an electrical wire including a core wire and an insulating covering for covering the core wire; and a sheet material in which the electrical wire is disposed on a resin main surface, and a part of the main surface having contact with the electrical wire is welded to the insulating covering of the electrical wire, thereby forming an electrical wire fixing part, wherein a thickness dimension of a first covering part in the insulating covering on a side of the electrical wire fixing part in relation to the core wire is formed smaller than a thickness dimension of a second covering part located on an opposite side of the core wire.

A wire harness according to a second aspect is the wire harness according to the first aspect, wherein a sum of a thickness dimension of a part of the sheet material to which the first covering part is welded and a thickness dimension of the first covering part is formed equal to or larger than a thickness dimension of the second covering part.

A wire harness according to a third aspect is the wire harness according to the first or second aspect, wherein a width dimension at a boundary surface of a welding part between the insulating covering and the sheet material is formed larger than a width dimension in a part of the electrical wire through a center of the core wire.

A wire harness according to a fourth aspect is the wire harness according to any one of the first to third aspects, wherein a part including the electrical wire fixing part is formed equal to or harder than the insulating covering.

A wire harness according to a fifth aspect is the wire harness according to the fourth aspect, wherein both the insulating covering and the electrical wire fixing part are formed of a material including polyvinyl chloride and a plasticizer, and a ratio of a plasticizer to polyvinyl chloride constituting the part including the electrical wire fixing part is equal to or smaller than a ratio of a plasticizer to polyvinyl chloride constituting the insulating covering, thus the part including the electrical wire fixing part is formed equal to or harder than the insulating covering.

A method of manufacturing a wire harness according to a sixth aspect includes steps of: (a) locating an electrical wire including a core wire and an insulating covering for covering the core wire on a resin electrical wire disposed part in a sheet material, and sandwiching the electrical wire and the electrical wire disposed part by a sandwiching member; and (b) after the step of (a), ultrasonic-welding the insulating covering and the electrical wire disposed part, wherein at a time of performing the step of (b), a part including the electrical wire disposed part becomes equal to or harder than the insulating covering.

A method of manufacturing a wire harness according to a seventh aspect is the method of manufacturing the wire harness according to the sixth aspect, wherein both the insulating covering and the electrical wire disposed part are formed of a material including polyvinyl chloride and a plasticizer, and at a time of performing the step of (b), a ratio of a plasticizer to polyvinyl chloride constituting the part including the electrical wire disposed part is equal to or lower than a ratio of a plasticizer to polyvinyl chloride constituting the insulating covering, thus the part including the electrical wire disposed part becomes equal to or harder than the insulating covering.

Effects of the Invention

According to the first to fifth aspects, the thickness of the wire harness can be reduced by the amount that the thickness dimension of the first covering part is made smaller than the thickness dimension of the second covering part. At this time, insulation properties of the first covering part having the reduced thickness can be compensated by the sheet material.

According to the second aspect, insulation properties on the side of the first covering part for the core wire can be increased.

According to the third aspect, adhesion strength in welding can be increased.

According to the fourth aspect, the thickness dimension of the first covering part can be made easily smaller than the thickness dimension of the second covering part.

According to the fifth aspect, even when general polyvinyl chloride is used as a material of the insulating covering of an automobile electrical wire, the electrical wire fixing part can be formed harder than the insulating covering.

According to the sixth aspect, the sheet material is equal to or harder than the insulating covering under a temperature heated by frictional heat at the time of the ultrasonic welding and pressure, thus when the welding proceeds in that state, the part of the insulating covering on the side of the sheet material is deformed to the same degree or more easily than the sheet material. Thus, even when the electrical wire having the insulating covering with the uniform thickness is used, the thickness of the part of the insulating covering on the side of the sheet material in relation to the core wire can be made smaller than that on the opposite side thereof.

According to the seventh aspect, even when general polyvinyl chloride is used as a material of the insulating covering of an automobile electrical wire, the electrical wire fixing part can be formed equal to or harder than the insulating covering.

BRIEF DESCRIPTION OF DRAWINGS

FIG. 5 A diagram for explaining a manufacture of the wire harness according to the embodiment.

FIG. 6 A cross-sectional view illustrating a wire harness according to a modification example.

DESCRIPTION OF EMBODIMENT(S)

Embodiment

Figure 1:
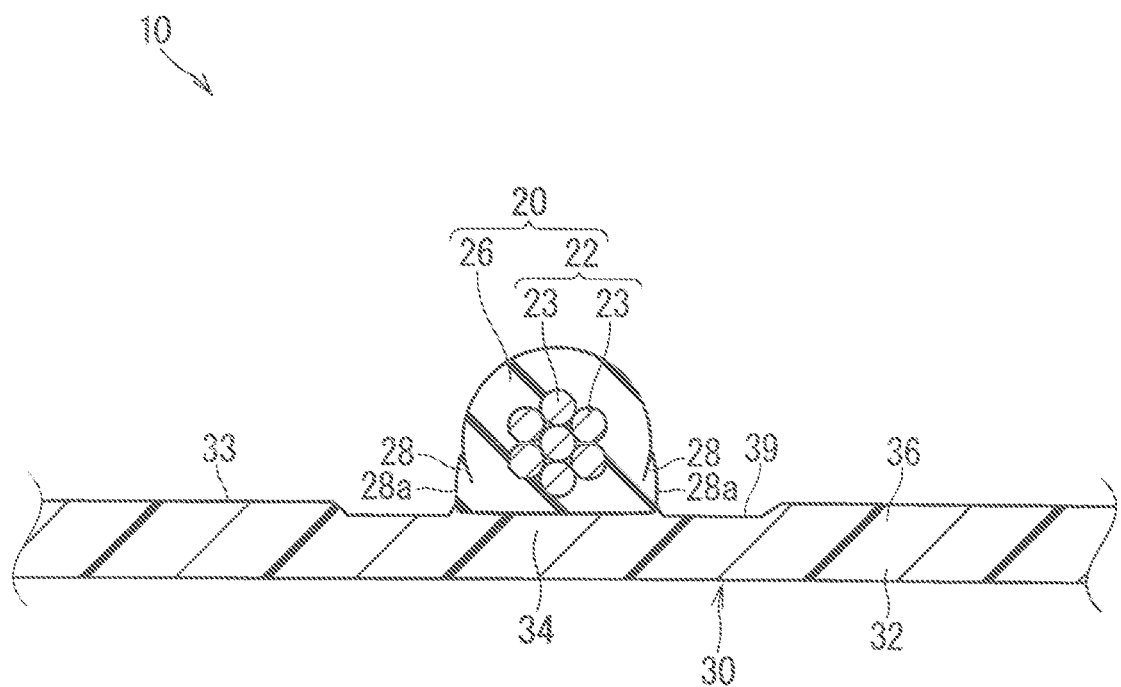
FIG. 1 A cross-sectional view illustrating a wire harness according to an embodiment.

A wire harness according to an embodiment is described hereinafter. FIG. 1 is a cross-sectional view illustrating a wire harness 10 according to the embodiment.

The wire harness 10 is used as a wiring member mounted to a vehicle to electrically connect various apparatuses, for example. The wire harness 10 includes an electrical wire 20 and a sheet material 30. In an example illustrated in FIG. 1, one electrical wire 20 is disposed on one sheet material 30, and there may also be obviously a case where a plurality of electrical wires 20 are disposed on one sheet material 30.

The electrical wire 20 is connected to various apparatuses mounted to a vehicle via a terminal or a connector connected to an end portion of the electrical wire 20, for example. The electrical wire 20 includes a core wire 22 and an insulating covering 26 for covering the core wire 22.

The core wire 22 is made up of one or a plurality of strands 23 (seven in the example illustrated in FIG. 1). Each strand 23 is a linear member formed of a conductive material such as copper, copper alloy, aluminum, and aluminum alloy, for example. When the core wire 22 is made up of the plurality of strands 23, the core wire 22 is preferably a stranded wire made up of the plurality of strands 23.

The insulating covering 26 is formed by extrusion molding of a resin material having insulation properties such as polyvinyl chloride (PVC) or polyethylene (PE) around the core wire 22 or applying a resin coating of enamel, for example, around the core wire 22. Herein, the insulating covering 26 includes a thermoplastic resin. Particularly, in the description herein, the insulating covering 26 is formed of a resin material including PVC.

More specifically, the insulating covering 26 is formed of a material with PVC as a base to which a plasticizer is added. The plasticizer is an additive agent for softening a synthetic resin product, and in the synthetic resin product a product having a high ratio of the plasticizer to the synthetic resin is generally softer than a product having a low ratio of the plasticizer. A type of the plasticizer is not particularly limited, but applicable is a plasticizer such as phthalic ester, trimellitic acid ester, pyromellitic acid ester, fatty acid ester, and fatty acid polyester, for example. One type of the plasticizer may be solely used, or plural types of the plasticizers may also be used together. It is also considered that various types of additive agents such as a stabilizer other than the plasticizer is added to PVC constituting the insulating covering 26.

At least part of the insulating covering 26 disposed on the sheet material 30 is welded (herein, ultrasonic welded) to the sheet material 30, thus the electrical wire 20 is fixed to the sheet material 30.

At this time, a route of the electrical wire 20 disposed on the sheet material 30 is not particularly limited. For example, the electrical wire 20 may extend linearly on the sheet material 30 or may also be curved. When the plurality of electrical wires 20 are disposed on one sheet material 30, there may be a case where the plurality of electrical wires 20 all extend in the same direction or partially extend in a different direction. There may also be a case where a branch part where the plurality of electrical wires 20 branch off is formed on the sheet material 30.

It is not particularly limited which region is welded in the electrical wire 20 disposed on the sheet material 30 along a longitudinal direction. For example, the insulating covering 26 and the sheet material 30 may be sequentially welded along the longitudinal direction of the electrical wire 20, or a partial welding (spot welding) may be performed on a plurality of positions along the longitudinal direction of the electrical wire 20. In the former case, a whole region in the electrical wire 20 disposed on the sheet material 30 may be welded or there may be partially an area not welded. In the latter case, a pitch between the spot welding positions may be or may not be constant.

An outer peripheral surface of a part of the insulating covering 26 welded to the sheet material 30 is formed into a shape partially deformed from a circumferential surface shape. For example, it is considered that a so-call round wire having a uniform circumferential surface shape is adopted as the electrical wire 20, and a part of the insulating covering 26 in the round wire is partially deformed to form the electrical wire 20 described above.

The sheet material 30 includes an electrical wire fixing layer 32 made of resin. In the description herein, the sheet material 30 has a single layer structure of only the electrical wire fixing layer 32. The electrical wire 20 is disposed on a main surface 33 of the electrical wire fixing layer 32 made of resin. A part of the main surface 33 having contact with the electrical wire 20 is welded to the insulating covering 26 of the electrical wire 20, thereby forming an electrical wire fixing part 34. The part of the electrical wire fixing layer 32 other than the electrical wire fixing layer 34, that is to say, the part where the electrical wire 20 is not disposed on the main surface 33 is referred to as an electrical wire un-disposed part 36. A part of the sheet material 30 including the electrical wire fixing part 34 (the electrical wire fixing layer 32 herein) is formed equal to or harder than the insulating covering 26. Rockwell hardness, for example, can be used as an index of such hardness.

A material constituting a part of the sheet material 30 including the electrical wire fixing part 34 is not particularly limited as long as it can be welded to the insulating covering 26. However, the part of the sheet material 30 including the electrical wire fixing part 34 preferably include the same resin as the insulating covering 26. Accordingly, adhesion strength between the electrical wire fixing part 34 and the insulating covering 26 by welding can be increased. In the description herein, the insulating covering 26 includes PVC, thus the part of the sheet material 30 including the electrical wire fixing part 34 is also formed of a material including PVC.

More specifically, the part of the sheet material 30 including the electrical wire fixing part 34 is formed of a material with PVC as a base to which a plasticizer is added. A type of the plasticizer is not particularly limited, but applicable is a plasticizer such as phthalic ester, trimellitic acid ester, pyromellitic acid ester, fatty acid ester, and fatty acid polyester, for example. One type of the plasticizer may be solely used, or plural types of the plasticizers may also be used together. In the description hereinafter, a plasticizer added to PVC constituting the part including the electrical wire fixing part 34 is the same as a plasticizer added to PVC which is a material of the insulating covering 26. At this time, a ratio of the plasticizer to PVC constituting the part including the electrical wire fixing part 34 is equal to or lower than a ratio of the plasticizer to PVC constituting the insulating covering 26, thus the part including the electrical wire fixing part 34 is equal to or harder than the insulating covering 26.

It is also considered that the plasticizer added to PVC constituting the part including the electrical wire fixing part 34 is different from the plasticizer added to PVC constituting the insulating covering 26. It is also considered that various types of additive agents such as a stabilizer other than the plasticizer is added to PVC constituting the part including the electrical wire fixing part 34.

When the electrical wire fixing part 34 is viewed, the sheet material 30 and the insulating covering 26 are welded while the insulating covering 26 is deformed to follow the main surface 33 of the sheet material 30. From the other viewpoint, a boundary surface of the welding to the electrical wire fixing part 34 is formed into a shape closer to the shape of the main surface 33 in the electrical wire un-disposed part 36 than the circumferential surface shape of the insulating covering 26.

In the description herein, the above deformation in the insulating covering 26 occurs in ultrasonic welding. That is to say, the round wire and the sheet material 30 are ultrasonic-welded, thus the part of the insulating covering 26 ultrasonic-welded to the sheet material 30 is deformed from the original circumferential surface shape to a shape following the main surface 33 of the sheet material 30 (herein, a shape close to a flat surface). In this manner, it is considered that the insulating covering 26 is deformed in the ultrasonic welding by reason that the sheet material 30 is equal to or harder than the insulating covering 26 as described above, thus a deformation amount of the insulating covering 26 is larger than that of the sheet material 30 in the ultrasonic welding.

Figure 2:
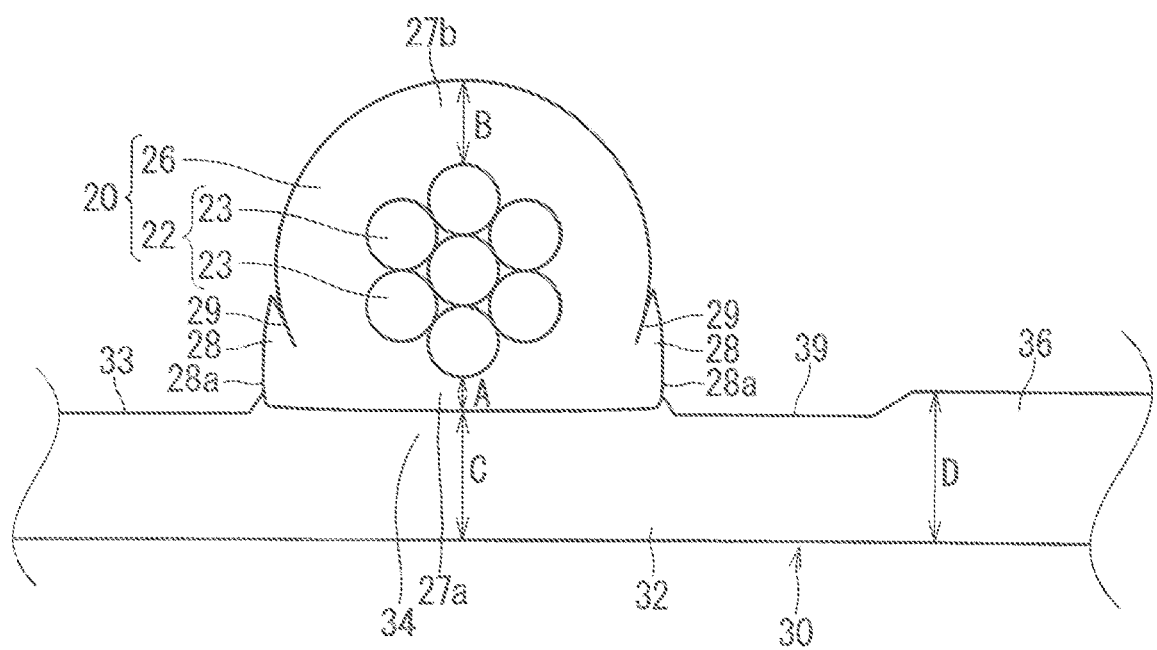
FIG. 2 A drawing for explaining a thickness dimension of each part of the wire harness.

Next, a thickness dimension of each part of the wire harness 10 is described with reference to FIG. 2. FIG. 2 is a drawing for explaining a thickness dimension of each part of the wire harness 10. A hatching of across section is omitted in FIG. 2.

A dimension A in FIG. 2 is a thickness dimension of a first covering part 27a in the insulating covering 26 located on a side of the electrical wire fixing part 34 in relation to the core wire 22. The dimension A is the thickness dimension in a direction through a center of the core wire 22 along a normal direction of the main surface 33 of the sheet material 30, for example. A position of the dimension A is located in a part where the electrical wire 20 and the sheet material 30 have first contact with each other at the time of the ultrasonic welding, for example.

A dimension B in FIG. 2 is a thickness dimension of a second covering part 27b in the insulating covering 26 located on an opposite side of the core wire 22 from the first covering part 27a. The dimension B is the thickness dimension in the same direction as the dimension A, for example.

A dimension C in FIG. 2 is a thickness dimension of a part of the sheet material 30 where the first covering part 27a is welded. The dimension C is the thickness dimension in the same direction as the dimension A, for example.

A dimension D in FIG. 2 is a thickness dimension in a position in the sheet material 30 apart from the electrical wire 20. The dimension D is considered a dimension of a part including the electrical wire un-disposed part 36 having the largest thickness. The dimension D is considered to be the same as the thickness dimension of the sheet material 30 before welding.

As illustrated in FIG. 2, the thickness dimension A of the first covering part 27a in the insulating covering 26 on the side of the electrical wire fixing part 34 in relation to the core wire 22 is formed smaller than the thickness dimension B of the second covering part 27b located on the opposite side thereof. Accordingly, a thickness dimension as the wire harness 10 is reduced.

As illustrated in FIG. 2, a sum of the thickness dimension C of the part of the sheet material 30 to which the first covering part 27a is welded and the thickness dimension A of the first covering part 27a is formed equal to or larger than the thickness dimension B of the second covering part 27b. Accordingly, insulation properties on the side of the first covering part 27a can be increased.

In FIG. 2, the dimension C is formed smaller than the dimension D, however, there may also be a case where the dimension C is formed equal to or larger than the dimension D.

Figure 3:
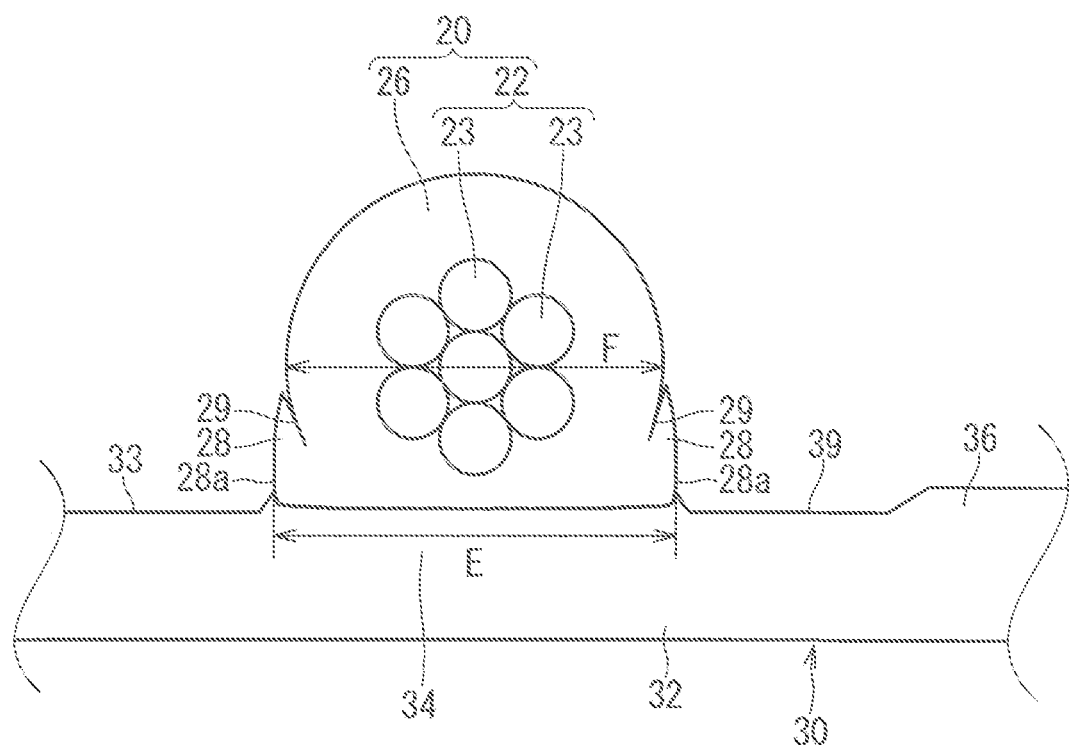
FIG. 3 A drawing for explaining a width dimension of each part of the wire harness.

Next, a width dimension of each part of the wire harness 10 is described with reference to FIG. 3. FIG. 3 is a drawing for explaining a width dimension of each part of the wire harness 10. A hatching of a cross section is omitted in FIG. 3. The width dimension herein indicates a dimension in a direction along a direction in which the main surface 33 of the sheet material 30 extends, and indicates a dimension in a direction along a direction intersecting (direction perpendicular to) a pressure direction in welding.

A dimension E in FIG. 3 is a width dimension at a boundary surface of a welding part between the insulating covering 26 and the sheet material 30. The dimension E is a dimension from one end portion to the other end portion at the boundary surface of the welding part between the insulating covering 26 and the sheet material 30.

A dimension F in FIG. 3 is a width dimension in a part of the electrical wire 20 through a center of the core wire 22. The dimension F coincides with a diameter of the electrical wire 20 before welding, for example.

As illustrated in FIG. 3, herein, the width dimension E at the boundary surface of the welding part between the insulating covering 26 and the sheet material 30 is formed larger than the width dimension F in the part of the electrical wire 20 through the center of the core wire 22. Accordingly, an area of the welding increases, and the bonding strength between the insulating covering 26 and the sheet material 30 can be increased.

<Manufacturing Method>

Figure 4:
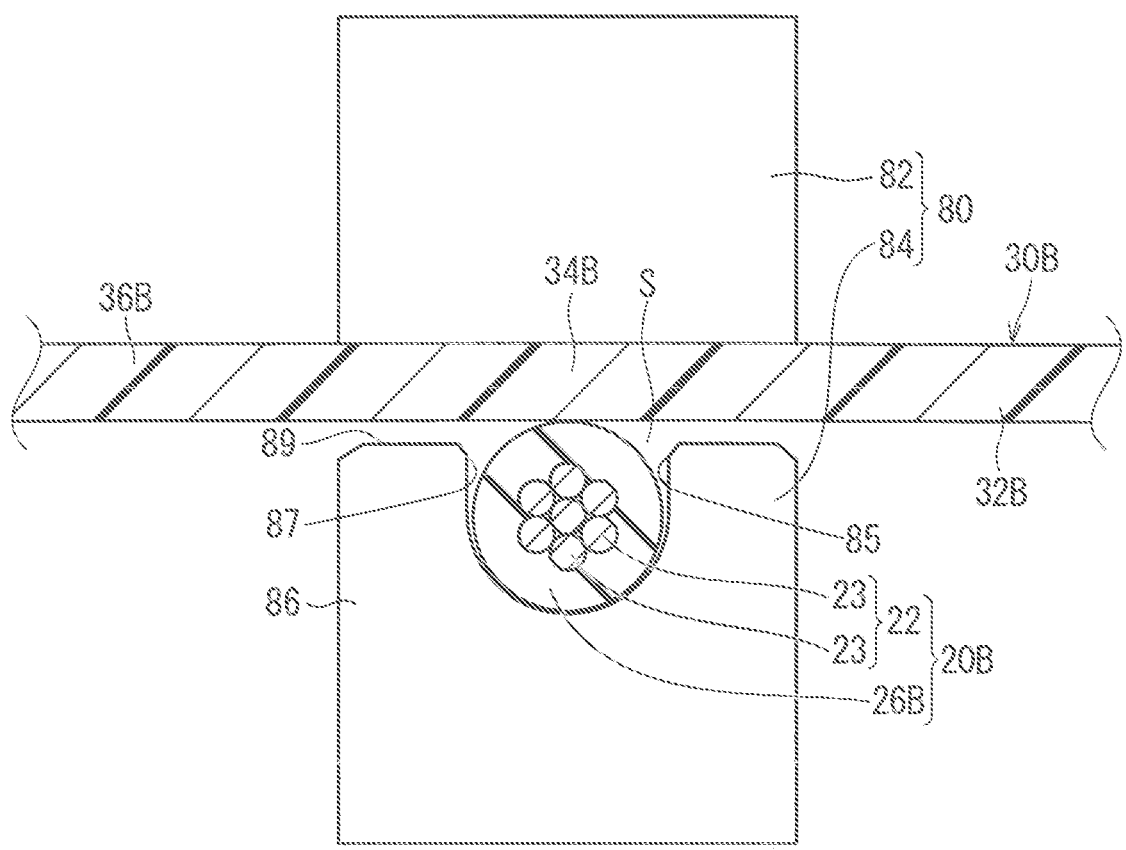
FIG. 4 A diagram for explaining a manufacture of the wire harness according to the embodiment.

Described next is a method of manufacturing a wire harness 10 according to an embodiment. FIG. 4 and FIG. 5 are diagrams for explaining a manufacture of the wire harness 10 according to the embodiment. An electrical wire 20B, for example, in FIG. 4 and FIG. 5 illustrates the electrical wire before welding. That is to say, in the description hereinafter, when the electrical wire, the sheet material, and each element thereof before welding need to be distinguished from those after welding, a reference sign B may be added to the constituent elements before welding in some cases.

Herein, the electrical wire 20B and a sheet material 30B are ultrasonic-welded by an ultrasonic welding machine 80 to manufacture the wire harness 10. Herein, the electrical wire 20B is around wire. The sheet material 30B is a member made up of one layer, and an electrical wire disposed part 34B where the electrical wire 20B is disposed has a flat surface. The ultrasonic welding machine 80 includes a horn 82 and an anvil 84.

The horn 82 is a member providing a work having contact with the horn 82 of ultrasonic vibration. It is also considered that a convex-concave shape is applied on a surface of the horn 82 having contact with the work as knurled processing, that is to say, for a purpose of slip resistance. The anvil 84 is a member supporting the work with the horn 82 from an opposite side thereof. Accordingly, a pair of parts to be welded in the work are sandwiched between the horn 82 and the anvil 84, thereby being provided with the ultrasonic vibration and welded.

Specifically, in performing the ultrasonic welding, the electrical wire 20B is firstly disposed on an electrical wire disposed part 34B formed equal to or harder than the insulating covering 26B in the resin sheet material 30B, and the electrical wire 20B and the electrical wire disposed part 34B are sandwiched by a sandwiching member. For example, as illustrated in FIG. 4, the electrical wire 20B before welding is disposed on a predetermined position on the main surface 33 of the sheet material 30B (the electrical wire disposed part 34B), and is supported by the anvil 84. In this state, the horn 82 is brought close to the anvil 84, and the electrical wire 20B and the sheet material 30B are sandwiched by the horn 82 and the anvil 84 so that the insulating covering 26B and the electrical wire disposed part 34B have contact with each other. In this manner, the horn 82 is disposed to press a side of the sheet material 30B and the anvil 84 is disposed to press a side of the electrical wire 20B herein, however, also considered is a case where the horn presses the side of the electrical wire 20B and the anvil presses the side of the sheet material 30B.

A holding groove 85 holding the electrical wire 20B is formed in a surface of the anvil 84 facing a side of the horn 82. A bottom surface of the holding groove 85 may have a flat surface shape or curved surface shape. In the example illustrated in FIG. 4, the bottom part of the holding groove 85 is formed into the curved surface shape.

Herein, a depth dimension of the holding groove 85 is set to approximately equal to the diameter of the electrical wire 20B (slightly smaller than the diameter of the electrical wire 20B in the example illustrated in FIG. 4), thus a tip end portion of a wall part 86 constituting the holding groove 85 functions as a pressing part 89 sandwiching a part of the sheet material 30B where the electrical wire 20B is not disposed with the horn 82.

A side closer to an opening part in relation to the bottom part of the holding groove 85 formed into the curved surface shape has a constant width. Thus, an inner surface of the wall part 86 extending from the bottom part of the holding groove 85 to a tip end portion of the pressing part 89 constitutes a vertical surface 87.

Herein, as described above, from a viewpoint that the wire harness 10 is disposed in a narrow space in a vehicle, the wire harness 10 preferably has a small thickness. Thus, from this viewpoint, the sheet material 30B preferably has a small thickness. Herein, a thickness dimension of the sheet material 30B before welding is set smaller than the diameter of the electrical wire 20B. The thickness dimension of the sheet material 30B before welding may be obviously set equal to or larger than the diameter of the electrical wire 20B.

Particularly, herein, the thickness dimension of the sheet material 30B before welding is set smaller than a radius of the electrical wire 20B. The thickness dimension of the sheet material 30B before welding may be obviously set equal to or larger than the radius of the electrical wire 20B.

Herein, the thickness dimension of the sheet material 30B before welding is set larger than a thickness dimension of the insulating covering 26B (herein, an average thickness dimension in view of a fact that the plurality of strands 23 are located). The thickness dimension of the sheet material 30B before welding may be obviously set equal to or smaller than the thickness dimension of the insulating covering 26B.

Next, the electrical wire 20B and the electrical wire disposed part 34B are sandwiched by the sandwiching member, and the insulating covering 26B and the electrical wire disposed part 34B are ultrasonic-welded to each other. Herein, the ultrasonic vibration is provided by the horn 82 in a state where the part where the insulating covering 26B and the sheet material 30 have contact with each other is sandwiched between the horn 82 and the anvil 84. Herein, the horn 82 presses the side of the sheet material 30B, thus the ultrasonic vibration is provided from the side of the sheet material 30B. Frictional heat caused by the ultrasonic vibration is generated in the part where the insulating covering 26B and the sheet material 30 have contact with each other, and at least one of them is melted, thus they are joined to each other. Herein, both the insulating covering 26B and the sheet material 30B are formed of materials including PVC as a base, thus they are melted and joined to each other.

At the time of the ultrasonic welding, the electrical wire disposed part 34B becomes equal to or harder than the insulating covering 26B. Particularly, herein, both the insulating covering 26B and the electrical wire disposed part 34B are formed of materials including PVC and a plasticizer. At a point of time before the ultrasonic welding is started, the ratio of the plasticizer to PVC constituting the part including the electrical wire disposed part 34B is equal to or lower than the ratio of the plasticizer to PVC constituting the insulating covering 26B. This state is also continued at the time of the ultrasonic welding, thus the part including the electrical wire disposed part 34B is equal to or harder than the insulating covering 26B at the time of the ultrasonic welding.

At the time of the ultrasonic welding, the part including the electrical wire disposed part 34B is equal to or harder than the insulating covering 26B, thus force caused by pressure applied by the horn 82 and the anvil 84 tends to act as force of deforming the insulating covering 26B in the part where the electrical wire disposed part 34B and the insulating covering 26B have contact with each other. Accordingly, a boundary surface between the electrical wire fixing part 34 and the insulating covering 26B formed by welding the electrical wire disposed part 34B is formed into a shape closer to shape of the main surface 33 in the electrical wire disposed part 34B before welding than the circumferential surface shape which is the original outer peripheral surface of the insulating covering 26.

When there is a part which is not welded along the longitudinal direction of the electrical wire 20, for example, the shape of the circumferential surface which is the original outer peripheral surface of the insulating covering 26 can be confirmed by the part. Herein, also in the part of the electrical wire 20 which is welded along the longitudinal direction, the shape is hardly deformed at the time of welding in a surface on a side opposite to a surface to be welded, thus the shape of the circumferential surface can be also confirmed by this surface.

Before welding as illustrated in FIG. 4, a gap S is provided on a lateral side of the contact part between the electrical wire 20 and the sheet material 30B. Herein, as illustrated in FIG. 5, the insulating covering 26 softened in welding flows into the gap S. Accordingly, in the wire harness 10, the gap S is filled with a modification part 28 of the insulating covering 26. At this time, the inner surface of the holding groove 85 of the anvil 84 is located to fill an outer side of the gap S. Thus, the insulating covering 26 softened in welding is dammed by the inner surface of the holding groove 85 of the anvil 84, thus an outer surface of the modification part 28 of the insulating covering 26 is formed into a shape following the inner surface of the holding groove 85 of the anvil 84. Herein, the inner surface of the holding groove 85 of the anvil 84 is the vertical surface 87, thus the outer surface of the modification part 28 is a vertical surface 28a corresponding to the vertical surface 87.

There may also be a case where an interface 29 occurs between the modification part 28 and the original insulating covering 26 in a part of the modification part 28 away from the sheet material 30 (a part on a side of the second covering part 27b). The interface 29 is considered to occur when the original part of the insulating covering 26 falls short of melting by reason that energy on the modification part 28 is small at the time of the ultrasonic welding, for example. Obviously, there may also be a case where the interface 29 is not formed when the original part of the insulating covering 26 melts by reason that energy on the modification part 28 is large at the time of the ultrasonic welding, for example.

There may also be a case where a concave portion 39 is formed in a part of the main surface 33 of the sheet material 30 after welding pressed with the pressing part 89. Obviously, there may also be a case where the concave portion 39 is not formed.

<Effect Etc.>

According to the wire harness 10 having the configuration described above, the thickness of the wire harness 10 can be reduced by the amount that the thickness dimension A of the first covering part 27a is made smaller than the thickness dimension B of the second covering part 27b. At this time, insulation properties of the first covering part 27a having the reduced thickness can be compensated by the sheet material 30.

The sum of the thickness dimension C of the part of the sheet material 30 to which the first covering part 27a is welded and the thickness dimension A of the first covering part 27a is formed equal to or larger than the thickness dimension B of the second covering part 27b, thus insulation properties on the side of the first covering part 27a for the core wire 22 can be increased.

The width dimension E at the boundary surface of the welding part between the insulating covering 26 and the sheet material 30 is formed larger than the width dimension F in the part of the electrical wire 20 through the core wire 22, thus the bonding strength of welding can be increased.

The part including the electrical wire fixing part 34 is equal to or harder than the insulating covering 26, thus the thickness dimension of the first covering part 27a can be made smaller than that of the second covering part 27b.

Even when general polyvinyl chloride is used as the material of the insulating covering 26 of an automobile electrical wire, the electrical wire disposed part 34B and the electrical wire fixing part 34 can be formed harder than the insulating covering 26 by adjusting the ratio of the plasticizer.

Herein, the softness of the sheet material 30 and the insulating covering 26 is adjusted using the plasticizer. It is known that a plasticizer is transferred to a member having contact with the plasticizer as time proceeds, for example, in some cases. Thus, after the ultrasonic welding, the plasticizer may be transferred between the electrical wire fixing part 34 and the insulating covering 26 in some cases. In this case, it is also considered that immediately after welding, even when the electrical wire fixing part 34 is harder than the insulating covering 26, the plasticizer of the electrical wire fixing part 34 and the plasticizer of the insulating covering 26 reach equilibrium, and the electrical wire fixing part 34 and the insulating covering 26 have the same hardness. There may also be the other case where the insulating covering 26 is made harder than the electrical wire fixing part 34 by processing after the ultrasonic welding (for example, only the electrical wire fixing part 34 is hot-pressed in the electrical wire 20 and the electrical wire fixing part 34). Even in such a case, the boundary surface between the electrical wire fixing part 34 and the insulating covering 26 is considered to keep the shape following the main surface 33.

The sheet material 30 is equal to or harder than the insulating covering 26 under a temperature heated by frictional heat at the time of the ultrasonic welding and pressure, thus when the welding proceeds in that state, the part of the insulating covering 26 on the side of the sheet material 30 is deformed to the same degree or more easily than the sheet material 30. Thus, even when the electrical wire 20 having the insulating covering 26 with the uniform thickness is used, the thickness of the part of the insulating covering 26 on the side of the sheet material 30 in relation to the core wire 22 can be made smaller than that on the opposite side thereof.

Modification Example

FIG. 6 is a cross-sectional view illustrating a wire harness 110 according to a modification example.

In the description of the embodiment, the sheet material 30 has a single layer structure, however, this configuration is not necessary. There may also be a case where a sheet material has two or more layers as is a case in a sheet material 130 in a wire harness 110 according to a modification example.

Specifically, the sheet material 130 includes a first layer 32 as the electrical wire fixing layer 32 described above and a second layer 40 stacked on the first layer 32. The first layer 32 is uniformly formed of the same material as that constituting the part including the electrical wire fixing part 34. Accordingly, the first layer 32 is formed of a material with PVC as a base to which a plasticizer, which is the same as that added to the insulating covering 26, is added. A ratio of the plasticizer to PVC constituting the first layer 32 is equal to or higher than a ratio of the plasticizer to PVC constituting the insulating covering 26, thus the first layer 32 is formed equal to or harder than the insulating covering 26.

The second layer 40 has physical properties different from the first layer 32. More specifically, the first layer 32 is a part having physical properties more appropriate for welding to the insulating covering 26 than the second layer 40, and the second layer 40 is a part having physical properties needed depending on usage of the sheet material 30, for example.

For example, the second layer 40 is considered to be formed harder than the first layer 32 for a purpose of improving shape retainability. Accordingly, handleability of the wire harness 10 at a time of assembling the wire harness 10 to a vehicle can be improved compared with a case where a sheet material 30 is made up only of the first layer 32. The second layer 40 is also considered to be formed harder than the first layer 32 for a purpose of improving abrasion resistance properties, for example.

At this time, the second layer 40 is considered to be formed harder than the first layer 32 by a material including the same resin as the first layer 32 as abase. Herein, the first layer 32 includes PVC as the base, thus the second layer 40 is considered to include PVC as the base. In this case, a ratio of the plasticizer to PVC constituting the second layer 40 is made lower than a ratio of the plasticizer to PVC constituting the first layer 32, thus the second layer 40 can be harder than the first layer 32.

The second layer 40 is also considered to be formed harder than the first layer 32 by a material including a resin different from the first layer 32 as a base. Herein, the first layer 32 includes PVC as a base, thus the second layer 40 is considered to be formed of a material including a resin other than PVC such as PE, polyethylene (PE), polyethylene terephthalate (PET), for example, as a base.

A method of forming the sheet material 30 having the first layer 32 and the second layer 40 is not particularly limited, however, it is considered that the sheet material 30 is formed by a coextrusion method of achieving a laminated structure with a single extrusion process or a laminating method of separately forming the first layer 32 and the second layer 40 into a sheet-like shape and then mutually attaching them.

For example, metal foil such as aluminum foil is adopted as the second layer 40, thus it is considered that the sheet material 130 is configured to have shielding properties and increase heat radiation properties. For example, it is also considered that a non-woven fabric or a foam resin sheet softer than the first layer 32 is adopted as the second layer 40, thus the sheet material 130 is configured to increase a sound insulating function.

The sheet material is also considered to have a configuration of three or more layers. That is to say, a third layer and a fourth layer are sequentially stacked on the second layer 40 on a side opposite to the first layer 32.

In the description of the other configuration described above, the insulating covering 26 is deformed from the circumferential surface shape to the shape close to that of the main surface 33 of the sheet material 30 at the time of the ultrasonic welding, however, this configuration is not necessary. For example, the insulating covering 26 may be previously deformed from the circumferential surface shape to the shape close to that of the main surface 33 of the sheet material 30 before the ultrasonic welding. For example, a part of the circumferential surface shape may be extrusion-molded into a flat shape at the time of the extrusion molding of the insulating covering 26. In this case, the sheet material 30 may be formed softer than the insulating covering 26.

In the above description, the sum of the thickness dimension C of the part of the sheet material 30 to which the first covering part 27a is welded and the thickness dimension A of the first covering part 27a is formed equal to or larger than the thickness dimension B of the second covering part 27h, however, this configuration is not necessary. There may also be a case where the sum of the thickness dimension C of the part of the sheet material 30 to which the first covering part 27a is welded and the thickness dimension A of the first covering part 27a is formed smaller than the thickness dimension B of the second covering part 27b. In this case, insulation properties of the sheet material 30 are preferably higher than those of the insulating covering 26. That is to say, the sum of the thickness dimension C and the thickness dimension A may be smaller than the thickness dimension B as long as the part of the thickness dimensions C and A has insulation properties equivalent to or higher than the second covering part 27b.

The width dimension E at the boundary surface of the welding part between the insulating covering 26 and the sheet material 30 is formed larger than the width dimension F in the part of the electrical wire 20 through the core wire 22, however, this configuration is not necessary. It is also considered that the width dimension E at the boundary surface of the welding part between the insulating covering 26 and the sheet material 30 is equal to or smaller than the width dimension F in the part of the electrical wire 20 through the core wire 22. For example, the area of the welding part can be made small by reducing pressure at a time of ultrasonic welding or reducing vibration energy to be provided.

In the above description, the electrical wire 20 is a round wire, however, this configuration is not necessary. There may also be a case where an electrical wire such as an angular wire, for example, other than the round wire is adopted as the electrical wire 20.

In the above description, the insulating covering 26 and the electrical wire fixing layer 32 are formed of a material including PVC as a base, however, this configuration is not necessary. For example, there may also be a case where the insulating covering 26 and the electrical wire fixing layer 32 are formed of a material including PE or PP as a base. In this case, a density of PE or PP which is to be a base of the insulating covering 26 is made equal to or lower than that of PE or PP which is to be a base of the electrical wire fixing layer 32, or PE or PP which is to be a base of the insulating covering 26 is reacted with isobutylene, for example, thus the electrical wire fixing layer 32 can be made equal to or harder than the insulating covering 26.

In the above description, the outer surface of the modification part 28 has a shape following the inner surface of the anvil 84, however, this configuration is not necessary. For example, when the holding groove 85 is not formed in the anvil 84, or the holding groove 85 is shallowly formed therein, the outer surface of the modification part 28 may not have a shape following the inner surface of the anvil 84. In this case, the modification 28 easily extends along the main surface 33 of the sheet material 30, and as a result, the dimension E described above is considered to be larger than that illustrated in FIG. 3.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10 wire harness
20 electrical wire
22 core wire
23 strand
26 insulating covering
27a first covering part
27b second covering part
30 sheet material
32 first layer (electrical wire fixing layer)
33 main surface
34 electrical wire fixing part
34B electrical wire disposed part
36 electrical wire un-disposed part
40 second layer
80 ultrasonic welding machine
82 horn
84 anvil
85 holding groove

The invention claimed is:

1. A wire harness, comprising:
an electrical wire including a core wire and an insulating covering for covering the core wire; and
a sheet material in which the electrical wire is disposed on a resin main surface, and a part of the main surface having contact with the electrical wire is welded to the insulating covering of the electrical wire, thereby forming an electrical wire fixing part, wherein
a thickness dimension of a first covering part in the insulating covering on a side of the electrical wire fixing part in relation to the core wire is formed smaller than a thickness dimension of a second covering part located on an opposite side of the core wire,
a sum of a thickness dimension of a part of the sheet material to which the first covering part is welded and the thickness dimension of the first covering part is formed equal to or larger than the thickness dimension of the second covering part, and
each thickness dimension is measured along a line orthogonal to the sheet material and passing through a center of the core wire.

2. The wire harness according to claim 1, wherein
a width dimension at a boundary surface of a welding part between the insulating covering and the sheet material is formed larger than a width dimension in a part of the electrical wire through the center of the core wire.

3. The wire harness according to claim 1, wherein
a part including the electrical wire fixing part is formed equal to or harder than the insulating covering.

4. The wire harness according to claim 1, wherein
the insulating covering of the electrical wire fixing part covers an entire periphery of the core wire.

5. A wire harness, comprising:
an electrical wire including a core wire and an insulating covering for covering the core wire; and
a sheet material in which the electrical wire is disposed on a resin main surface, and a part of the main surface having contact with the electrical wire is welded to the insulating covering of the electrical wire, thereby forming an electrical wire fixing part, wherein
a thickness dimension of a first covering part in the insulating covering on a side of the electrical wire fixing part in relation to the core wire is formed smaller than a thickness dimension of a second covering part located on an opposite side of the core wire,
each thickness dimension is measured along a line orthogonal to the sheet material and passing through a center of the core wire,
a part including the electrical wire fixing part is formed equal to or harder than the insulating covering,
both the insulating covering and the electrical wire fixing part are formed of a material including polyvinyl chloride and a plasticizer, and
a ratio of a plasticizer to polyvinyl chloride constituting the part including the electrical wire fixing part is equal to or smaller than a ratio of a plasticizer to polyvinyl chloride constituting the insulating covering, thus the part including the electrical wire fixing part is formed equal to or harder than the insulating covering.

6. The wire harness according to claim 5, wherein
the insulating covering of the electrical wire fixing part covers an entire periphery of the core wire.

7. A method of manufacturing a wire harness, comprising:
(a) locating an electrical wire including a core wire and an insulating covering for covering the core wire on a resin electrical wire disposed part in a sheet material, and sandwiching the electrical wire and the electrical wire disposed part by a sandwiching member; and
(b) after the locating and sandwiching, ultrasonic-welding the insulating covering and the electrical wire disposed part, wherein
at a time of performing the ultrasonic-welding, a part including the electrical wire disposed part becomes equal to or harder than the insulating covering,
both the insulating covering and the electrical wire disposed part are formed of a material including polyvinyl chloride and a plasticizer, and
at a time of performing the ultrasonic-welding, a ratio of a plasticizer to polyvinyl chloride constituting the part including the electrical wire disposed part is equal to or lower than a ratio of a plasticizer to polyvinyl chloride constituting the insulating covering, thus the part including the electrical wire disposed part becomes equal to or harder than the insulating covering.

* * * * *